(No Model.)

L. B. FULLER.
ELECTRIC SMELLING BOTTLE.

No. 367,341. Patented July 26, 1887.

Witnesses.
W. Rossiter
Jno. H. Whipple

Inventor
Lloyd B Fuller
By Merriam & Whipple
Attys.

UNITED STATES PATENT OFFICE.

LLOYD B. FULLER, OF CHICAGO, ILLINOIS, ASSIGNOR OF ONE-HALF TO WILLIAM S. MITCHELL, OF SAME PLACE.

ELECTRIC SMELLING-BOTTLE.

SPECIFICATION forming part of Letters Patent No. 367,341, dated July 26, 1887.

Application filed March 7, 1887. Serial No. 229,937. (No model.)

*To all whom it may concern:*

Be it known that I, LLOYD B. FULLER, of Chicago, in the county of Cook and State of Illinois, have invented certain new and useful Improvements in Electric Smelling-Bottles, of which the following is a specification.

The invention relates to electric smelling-bottles, in which a medicine to be inhaled is kept for inhalation for the relief and cure of catarrh, bronchitis, asthma, hay-fever, sciatica, headache, and neuralgia; and the object of my improvement is to provide means for using electrolyte medicines in connection with a galvanic battery. I attain the object by the means illustrated in the accompanying drawings, of which—

Figure 1:
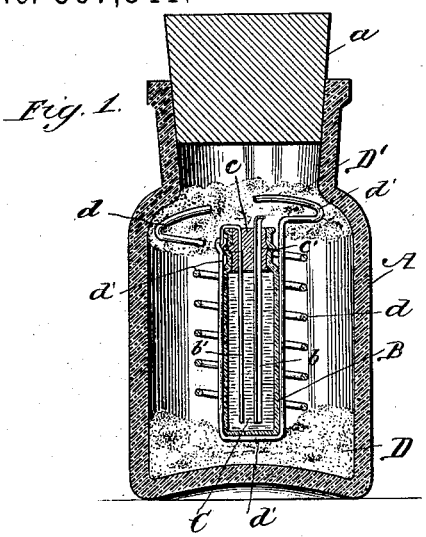
Figure 2:
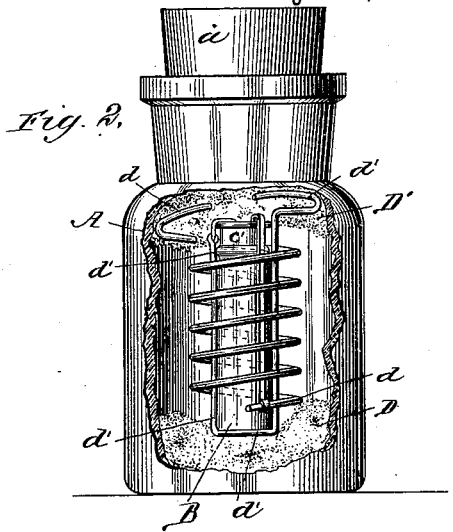
Figure 3:
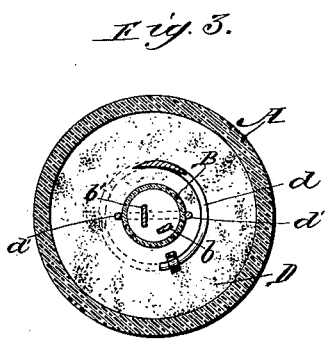
Figure 4:
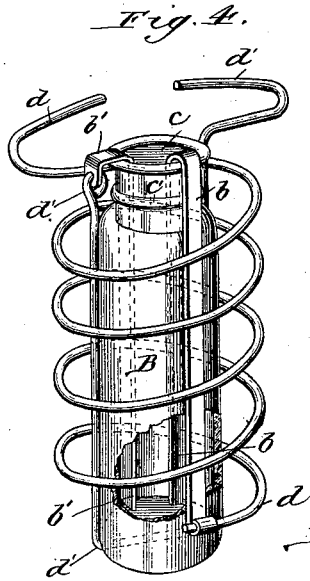

Figure 1 is a central vertical section of a glass bottle provided with a galvanic battery and appliances in connection therewith for containing the medicine. Fig. 2 is a side elevation of same with a portion broken away to show the interior, and Fig. 3 is a horizontal section of same. Fig. 4 is an enlarged perspective view of the battery and wires detached, showing the manner of running the wires.

A designates a bottle with a large mouth and neck provided with a cork, $a$, all of ordinary construction. This vial is provided with a battery consisting of a small jar, B, provided with a zinc plate, $b$, and a copper plate, $b'$, which are suspended in the jar and extend up out of the top.

The jar is filled with the ordinary battery-fluid, C, and after being filled the mouth and neck of the jar are filled with paraffine $c$ by melting it and pouring it in on top of the battery-fluid, so that it will fill the space around the zinc and copper plates above the fluid and extend into a groove, $c'$, formed in the neck of the jar and form a tight closing of the opening, which will prevent the escape of the battery-fluid and hold the plates in place. The groove $c'$ in the neck prevents the stopper of paraffine $c$ from either being pushed in or pulled out as soon as the paraffine hardens. The bottom of the jar is supported on a sponge, D, or layer of yielding substance. The zinc and copper plates are connected by wires $d\ d'$, which constitute the electrodes. These are extended around the jar and terminate in a sponge, D', placed on the top of the jar. The sponge D' is saturated with a medicine consisting of an electrolyzable fluid compound. The sponge is an inferior conductor and diffuses the current passing off the wires, and thus brings it into contact with the compound, so that electrolysis takes place. This produces a more powerful effect than can be produced by simple evaporation.

The vial is made of glass, (a non-conductor,) so that the electricity constantly accumulates in the vial and thus keeps a continuous powerful action as long as the battery lasts.

The bottle is kept corked when charged, and when using the cork is removed and the vapors inhaled.

Having thus described my invention, what I claim is—

The combination of the vial A, galvanic battery B, and sponge D', as and for the purpose specified.

LLOYD B. FULLER.

Witnesses:
JNO. H. WHIPPLE,
J. R. DEAN.